United States Patent [19]
Nakagawa

[11] Patent Number: 6,045,184
[45] Date of Patent: Apr. 4, 2000

[54] CHILD SEAT

[75] Inventor: Osamu Nakagawa, Tokyo, Japan

[73] Assignee: Takata Corporation, Tokyo, Japan

[21] Appl. No.: 09/216,725

[22] Filed: Dec. 21, 1998

[30] Foreign Application Priority Data

Jan. 12, 1998 [JP] Japan ................................. 10-004047

[51] Int. Cl.⁷ .................................................... A47C 1/08
[52] U.S. Cl. ................. 297/250.1; 297/484; 297/256.11
[58] Field of Search .................................. 297/236, 237, 297/238, 250.1, 256.11, 338, 484, 483, 256.16, 473, 486

[56] References Cited

U.S. PATENT DOCUMENTS

| | | | |
|---|---|---|---|
| 4,858,997 | 8/1989 | Shubin | 297/484 X |
| 5,082,325 | 1/1992 | Sedlack . | |
| 5,135,285 | 8/1992 | Dukatz et al. | 297/484 |
| 5,449,223 | 9/1995 | Miculici et al. . | |
| 5,527,093 | 6/1996 | Park | 297/484 X |
| 5,899,534 | 5/1999 | Gray | 297/484 |

FOREIGN PATENT DOCUMENTS

| | | |
|---|---|---|
| 0 287 259 | 10/1988 | European Pat. Off. . |
| 4-35931 | 3/1992 | Japan . |
| 6-35774 | 9/1994 | Japan . |

OTHER PUBLICATIONS

Patent Abstracts of Japan, vol. 97, No. 6, Jun. 30, 1997 & JP 09 039627 A (Molten Corp), Feb. 10, 1997.

*Primary Examiner*—Laurie K. Cranmer
*Attorney, Agent, or Firm*—Kanesaka & Takeuchi

[57] ABSTRACT

A child seat is provided wherein the distance between shoulder belts can be adjusted in accordance with the adjustment of the height of a seat plate. The seat plate formed of a front seat plate and a rear seat plate is supported to a seat body attached to a seat back such that the seat plate can be moved up and down. The seat plate is supported by a front link and a rear link. As the seat plate is moved up and down, an interlocking member is also moved up and down so that shoulder belt guides engaged with elongated holes of the interlocking member slide closer to and apart from each other, thereby adjusting the distance between the shoulder belts.

11 Claims, 7 Drawing Sheets

CHILD SEAT

FIELD OF THE INVENTION

The present invention relates to a child seat for seating an infant therein and, more particularly, to a child seat to be installed on a vehicle seat. In detail, the child seat to which the present invention relates is a child seat wherein a seat plate can be moved up and down and the distance between shoulder belts is adjusted in accordance with the movement of the seat plate.

DESCRIPTION OF PRIOR ART

One of child seats used in a vehicle for seating an infant therein is a child seat wherein a seat plate is adjustable in its height in accordance with the infant's body (for example, Japanese utility model publication (KOKOKU) JU 6-35774B, Japanese utility model publication (KOKAI) No. JU 4-35931B, Japanese patent publication (KOKAI) No. JP 9-39627A).

A child seat wherein shoulder belts are adjustable in the distance therebetween is disclosed in JP 64-28051A which is provided with a reversed T-shaped supporting member on a back of an upper portion of a seat back wherein the supporting member is moved up and down by a bolt and a pair of sliding members engaged with the right and left edges of the supporting member can be moved along inclined slots.

In the child seat disclosed in JP 64-28051A, the field of view of a small infant becomes narrow because the seat plate is not adjustable, so his or her amenity in the vehicle is decreased.

In the child seat disclosed in JU 6-35774B, an infant may feel uncomfortable contact with shoulder belts because the distance between the shoulder belts can not be adjusted while the seat plate can be moved up and down.

OBJECT AND SUMMARY OF THE INVENTION

It is an object of the present invention to provide a child seat wherein a seat plate can be moved up and down and the distance between shoulder belts can be adjusted in accordance with the vertical movement of the seat plate.

A child seat of the present invention comprises a seat back, a seat plate which can move up and down along the seat backs, two shoulder belts extending forward from the seat backs, and a distance adjusting means for adjusting the distance between the shoulder belts. The distance adjusting means adjusts the distance in accordance with the vertical movement of the seat plate.

In the child seat, as the height of the seat plate is adjusted to fit an infant's body, the distance between the shoulder belts is also adjusted together. That is, as the seat plate is moved upwardly for fitting a small infant, the distance between the shoulder belts is decreased. As the seat plate is moved downwardly for fitting a large infant, the distance between the shoulder belts is increased.

According to the present invention, as a mechanism for adjusting the distance between the shoulder belts together with the seat plate, the seat back may be provided with a pair of shoulder belt guides which can slide in the width direction of the seat back wherein the shoulder belts are suspended by the shoulder belt guides, and the child seat may further comprise an interlocking member for moving the shoulder belt guides closer to each other and apart from each other in accordance with the up-and-down movement of the seat plate. In this case, the interlocking member moves up and down along the rear surface of said seat back in accordance with the up-and-down movement of the seat plate, and the child seat may further comprise a means for sliding the shoulder belt guides by transforming the up-and-down movement of said interlocking member into the movement of the shoulder belt guides in a direction of moving closer and apart.

According to the present invention, the seat plate may comprise a front seat plate and a rear seat plate wherein a rear portion of the front seat plate and a front portion of the rear seat plate are slidably laid on each other, and a rear end portion of the rear seat plate may be engaged with the seat back such that the rear seat plate can slide up and down relative to the seat back. In this manner, the space between the seat plate and the seat back is never increased even when the seat plate is moved upwardly and the front seat plate is moved forwardly. The connection between the seat plate and the interlocking member can be always maintained.

BRIEF DESCRIPTION OF THE DRAWINGS

FIG. 6b is a sectional view taken along a line 6b—6b of FIG. 6a.

DETAILED DESCRIPTION OF PREFERRED EMBODIMENTS

Hereinafter, a preferred embodiment of the present invention will be described with reference to FIGS. 1 through 7c.

Figure 1:
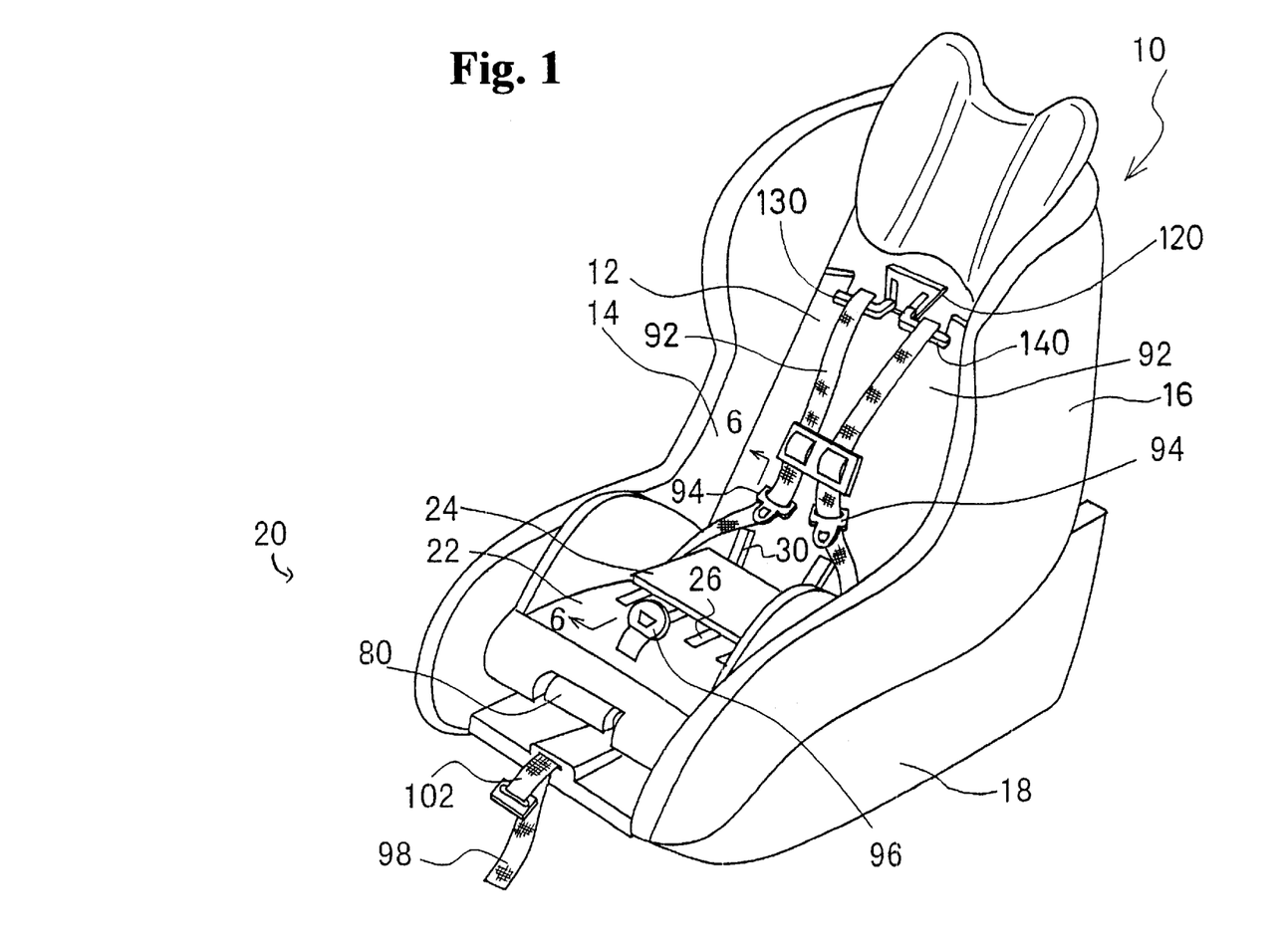
FIG. 1 is a perspective view of a child seat according to an embodiment.

A child seat 10 comprises a seat body 16 having seat sides 14, a seat back 12 fixed to the seat body 16, a seat plate 20 supported by the seat body 16 in such a manner that the seat plate 20 can travel up and down, and a base 18 supporting the seat body 16. The seat plate 20 comprises a front seat plate 22 and a rear seat plate 24. The front edge portion of the rear seat plate 24 is slidably laid on the top surface of the rear edge portion of the front seat plate 22.

Figure 6A:
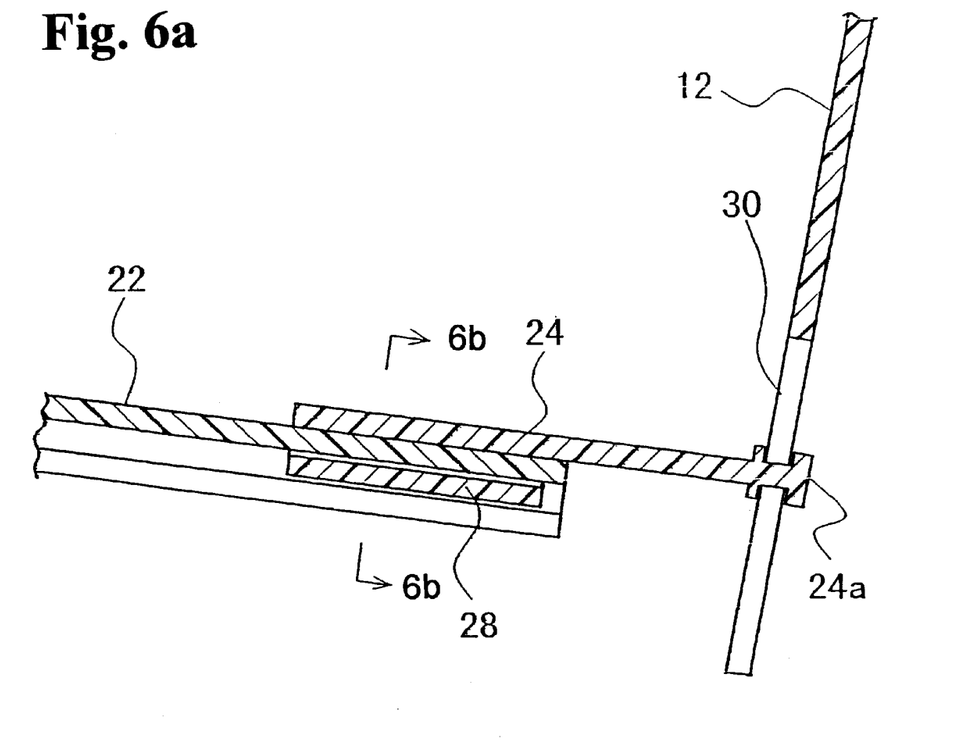
FIG. 6a is a sectional view taken along a line 6—6 of FIG. 1
Figure 6B:
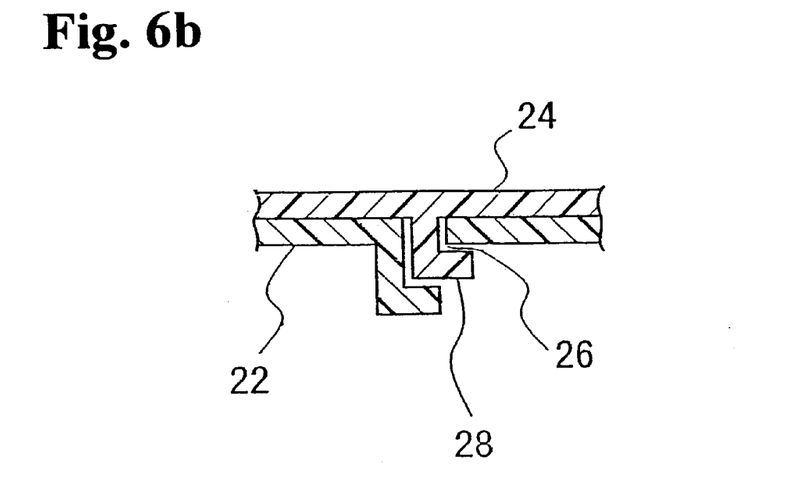

As shown in FIGS. 6a, 6b, the front seat plate 22 is provided with horizontal guide slits 26 extending in the longitudinal direction. The rear seat plate 24 is provided with projections 28 which is inserted into the horizontal guide slits whereby the front seat plate 22 is slidably connected to the rear seat plate 24.

As shown in FIG. 6a, the seat back 12 is provided with vertical guide slits 30 extending upwardly from the lower end thereof. Rear end portions 24a are slidably engaged with the vertical guide slits 30, respectively. Therefore, the rear seat plate 24 is allowed to move up and down with keeping the state that it is connected to the seat back 12.

Figure 4:
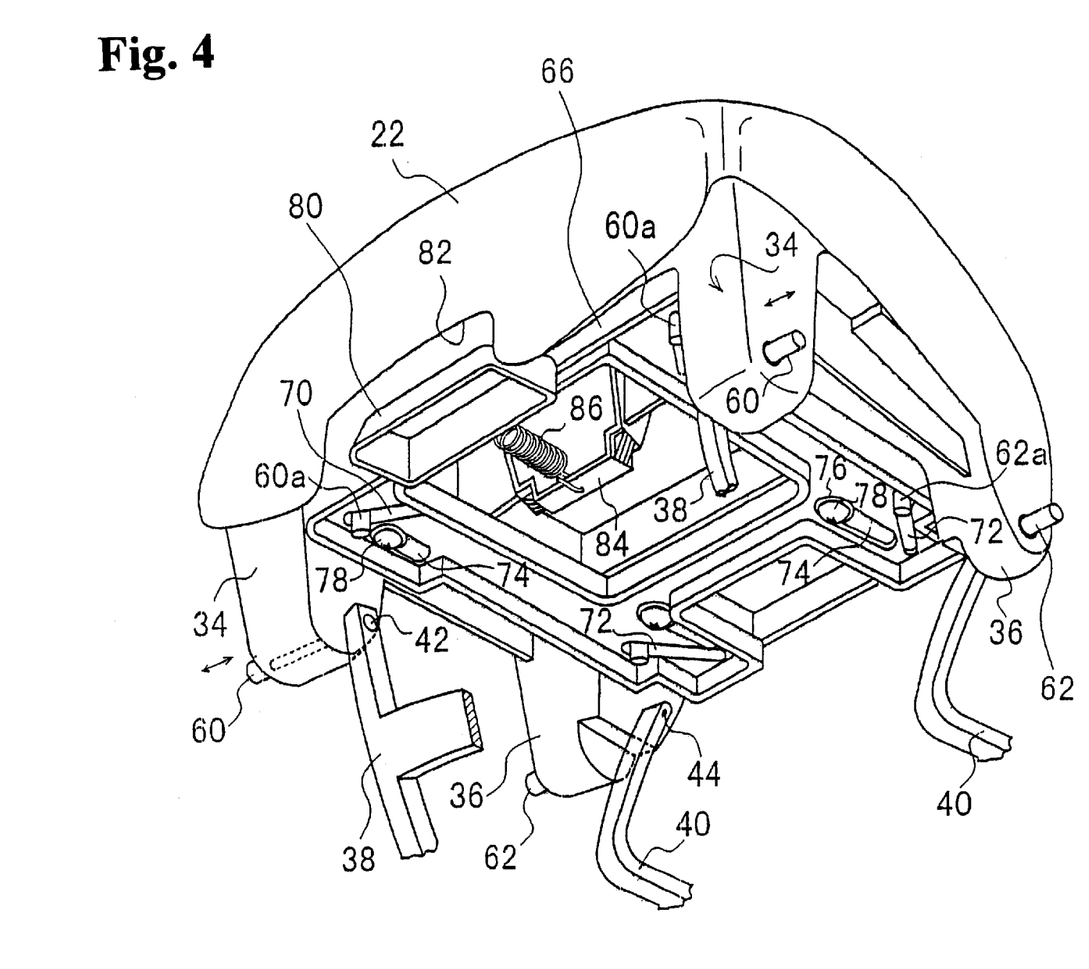
FIG. 4 is a perspective view of the seat plate and a slide frame taken from the underside.
Figure 5:
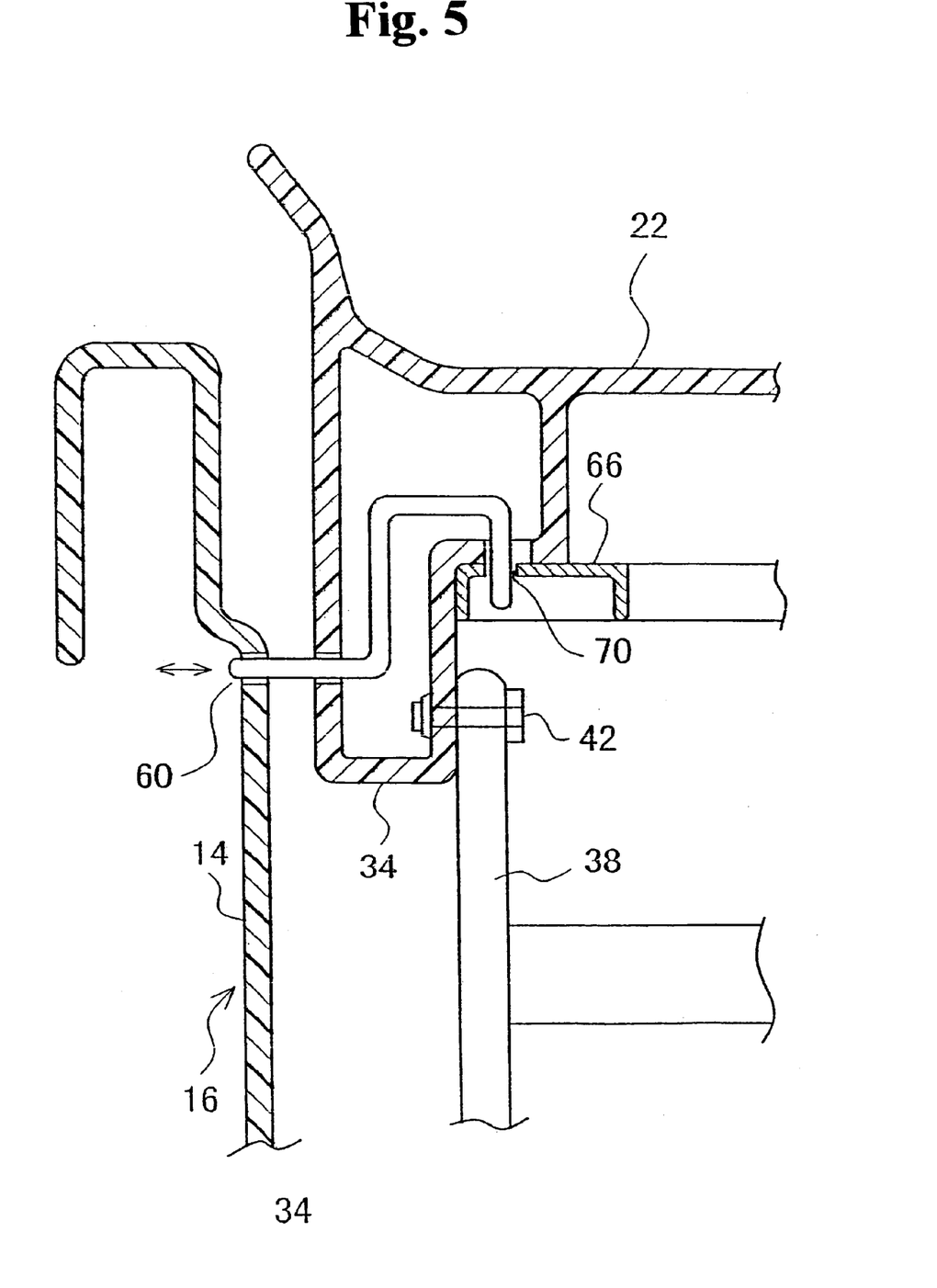
FIG. 5 is a sectional view taken along a line 5—5 of FIG. 3.

As shown in FIG. 4 and FIG. 5, the front seat plate 22 is provided with link connecting members 34, 36 projecting downwardly from front-side and rear-side portions of the lower surface thereof, respectively. The respective upper ends of front links 38 and rear links 40 are rotatably connected to the link connecting members 34, 36 by spindles 42, 44, respectively. The lower ends of the links 38, 40 are rotatably connected to link mounting members 46, 48 secured to the base 18, respectively.

The seat sides 14 composing the aforementioned seat body 16 are provided with insert holes 50, 52 formed at various levels for receiving pins 60, 62. The pins 60, 62 for inserting into the insert holes 50, 52 are disposed projecting from sides of the link connecting members 34, 36.

As shown in FIGS. 4 and 5, rear ends 60a, 62a of the pins 60, 62 are inserted into guide slits 70, 72 extending obliquely relative to the longitudinal direction of the child seat disposed on a slide frame 66 as a slide member.

The slide frame 66 has guide slits 74 extending in the longitudinal direction. Bolts 78 are inserted into the guide slits 74 via a slide washers 76 fixed to the link connecting members 34, 36. Therefore, the slide frame 66 is attached to the front seat plate 22 in such a manner that the slide frame 66 can slide in the longitudinal direction of the child seat 10.

A handle 80 disposed at the front side of the slide frame 66 is positioned to face a notch 82 formed in a central portion of the front portion of the front seat plate 22.

A spring fixing member 84 is disposed to project from the lower surface of a central portion of the front seat plate 22. Disposed between the rear-side portion of the handle 80 and the fixing member 84 is a tension coil spring 86 which always biases the slide frame 66 rearwardly (in a direction toward the seat back 12).

As the slide frame 66 is pulled by gripping the handle 80, the rear ends 60a, 62a are guided by the obliquely extending guide slits 70, 72 so that the pins 60, 62 come off the insert holes 50, 52. Accordingly, the seat plate 20 is allowed to move up and down. As the handle 80 is released, the slide frame 66 is pulled by the spring 86 to retreat and the pins 60, 62 are guided by the guide slits 70, 72 to project and thus enter into the insert holes 50, 52.

Figure 2:
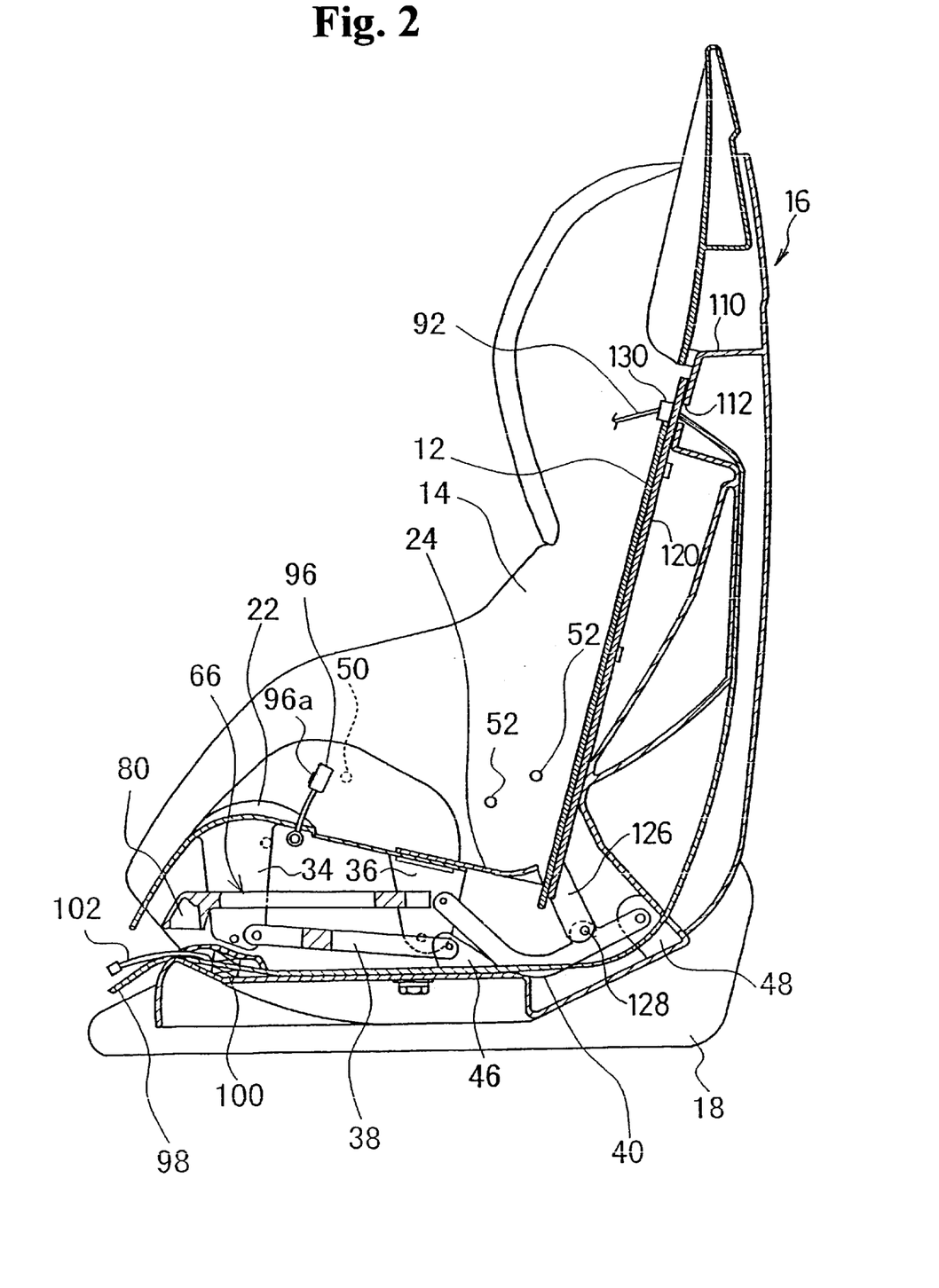
FIG. 2 is a vertical sectional view of the child seat of FIG. 1.
Figure 3:
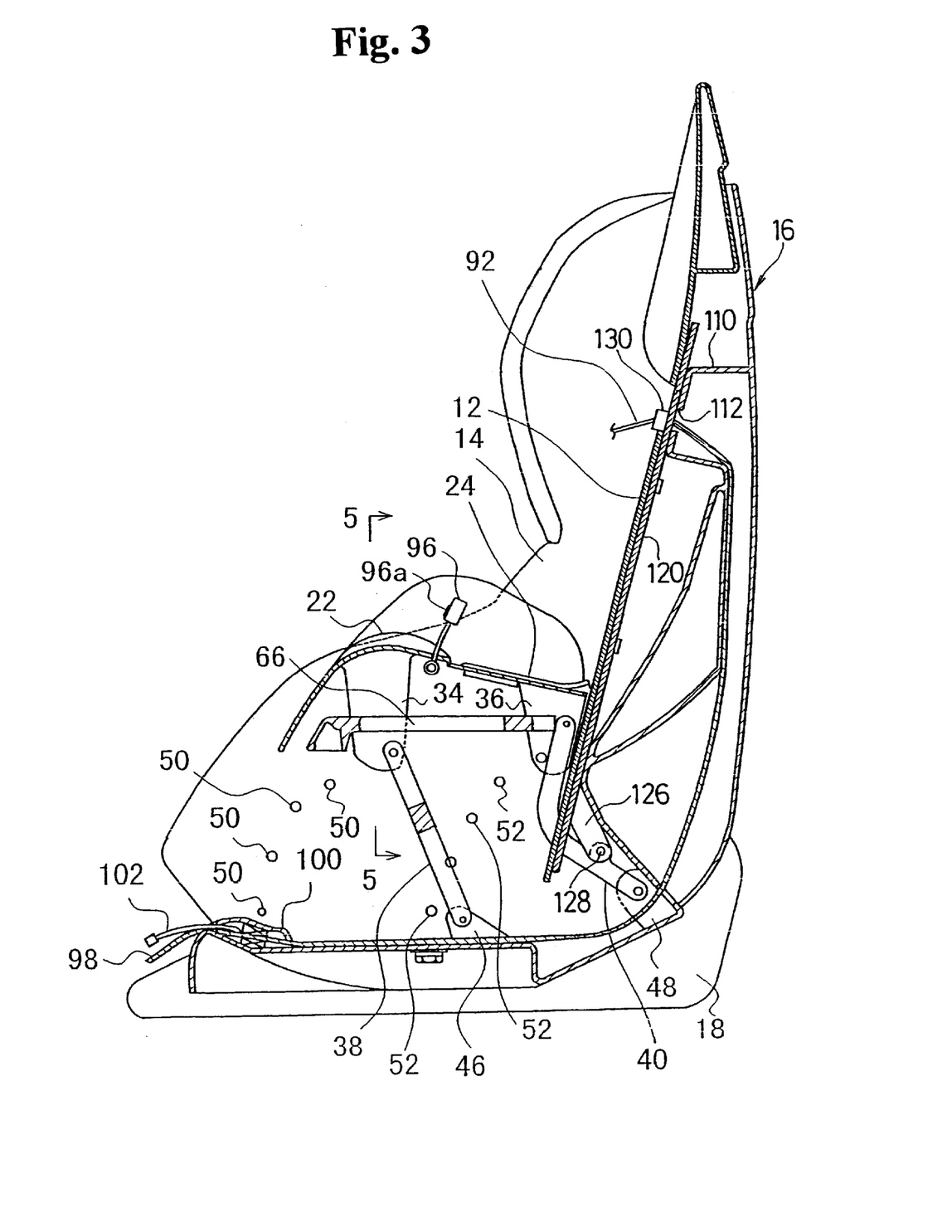
FIG. 3 is a sectional view of the child seat in a state that a seat plate is risen.

As shown in FIGS. 2 and 3, a back board portion of the seat body 16 has a double shell structure in which shoulder belts 92 are extended.

The two shoulder belts 92 are extended to the front side of the child seat through a slot 112 formed in a projection 110 disposed above the seat body 16. The slot 112 is angled in such a manner that the center thereof is the highest. Tongues 94 are attached to the shoulder belts 92, respectively, and are capable of engaging a buckle 96 disposed on the front seat plate 22. Numeral 96a of FIG. 2 and FIG. 3 designates a press button for releasing the tongues 94 from the buckle 96.

The rear ends of the shoulder belts 92 are connected to a tension belt 98 which is extended to the front side of the child seat through a space under the seat back 12 and the seat plate 20 and through a belt locking mechanism 100. The belt locking mechanism 100 has a locking function which allows the free passage of the tension belt 98 when pulled forwardly but locks the passage of the tension belt 98 when pulled rearwardly. In order to release this locking function, a lock release belt 102 is provided. As the lock release belt 102 is pulled, the tension belt 98 is allowed to move rightward of FIG. 2 and FIG. 3.

Hereinafter, a distance adjusting mechanism for the distance between the shoulder belts 92 will be described.

An interlocking member 120 is disposed in such a manner that it can slide up and down along the rear surface of the seat back 12. The interlocking member 120 has a lever 126 at the lower end thereof. An end of the lever 126 is attached to the rear link 40 by a shaft pin 128 as shown in FIG. 2 and FIG. 3, whereby the interlocking member 120 moves up and down according to the movement of the seat plate 20.

Figures 7A, 7B, 7C:
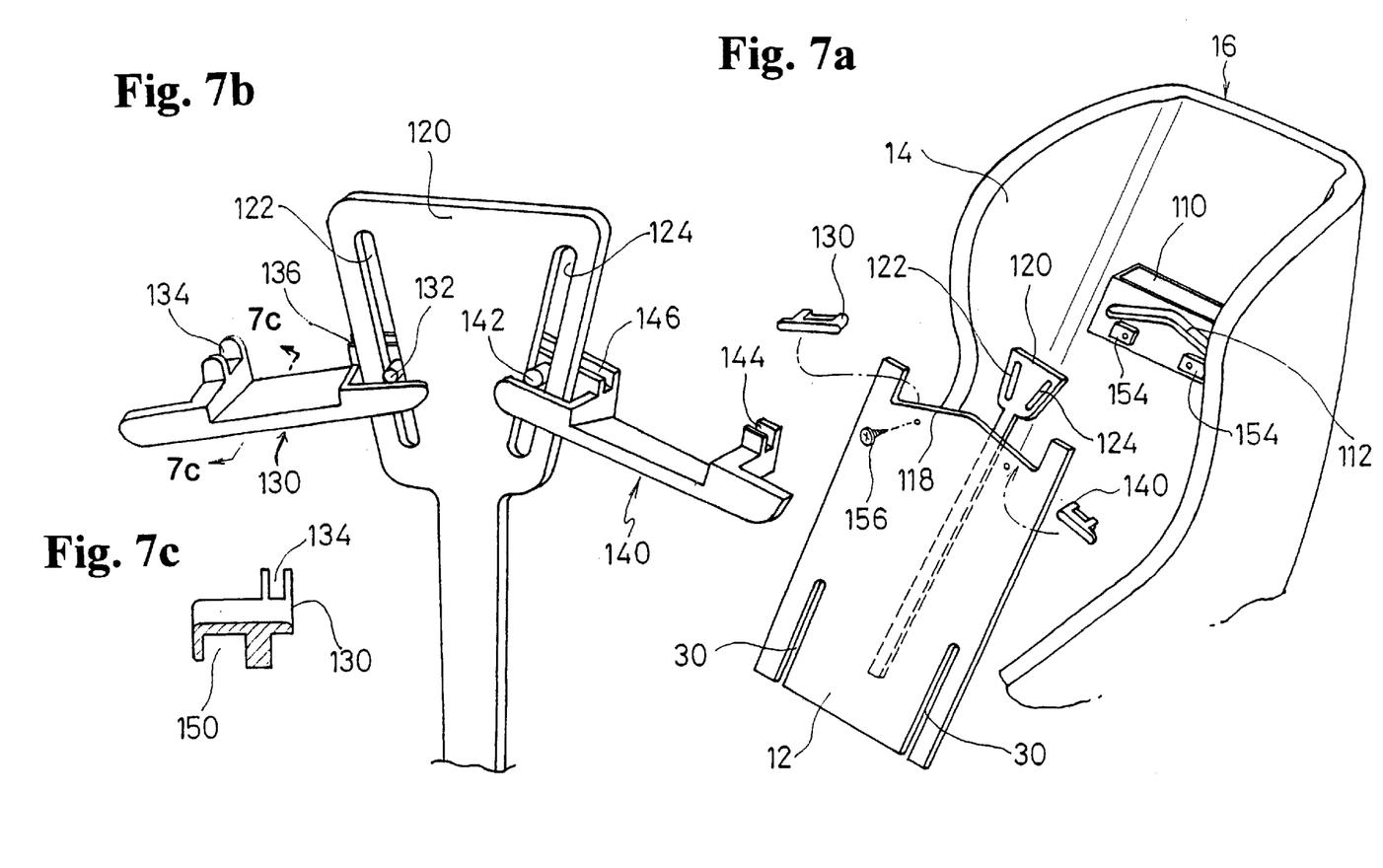
FIG. 7a is an exploded perspective view showing a distance adjusting mechanism of shoulder belts.
FIG. 7b is a perspective view of an interlocking member and a guide member.
FIG. 7c is a sectional view taken along a line 7c—7c of FIG. 7b.

As shown in FIGS. 7a and 7b, the interlocking member 120 has two elongated holes 122, 124 formed in an upper portion thereof. The elongated holes 122, 124 extend obliquely such that they are closer to each other at a lower portion and are spaced apart from each other at an upper portion.

Guide members 130, 140 are slidably fitted to the upper edge 118 of the seat back 12 and pins 132, 142 of the guide members 130, 140 are inserted into the elongated holes 122, 124 of the interlocking member 120, respectively.

Each guide member 130, 140 has a downward guide groove 150 to be fitted to the upper edge of the seat back 12 and also upward grooves 134 and 136, 144 and 146 are fitted to the upper edge of the slot 112 of the seat body 16. The grooves 134, 136, 144, 146, 150 enable the guide members 130, 140 to slide along the upper edge 118 of the seat back 12 and the slot 112 in the width direction of the seat body 16. Since the pins 132, 142 of the guide members 130, 140 are inserted into the elongated holes 122, 124 of the interlocking member 120, as the interlocking member 120 moves upward, the guide members 130, 140 becomes closer to each other, and as the interlocking member 120 moves downward, the guide members 130, 140 are spaced apart from each other.

The upper rear surface of the seat back 12 is in contact with projecting pedestals 154 on the front surface of the projection 110 and the upper portion of the seat back 12 is fixed to the projection 110 by screws 156. The interlocking member 120 is extended between the pedestals 154 and 154.

The seat body 16 and the seat plate 20 are covered by suitable soft covers, but not shown.

To adjust the height of the seat plate 20 in the child seat as structured above, the handle 80 of the slide frame 66 is pulled to cause the pins 60, 62 to come off the insert holes 50, 52 and the seat plate 20 is moved up or down as described above. As the handle 80 is released, the slide frame 66 retreats by the force of the springs 86 and the pins 60, 62 project. Then, by slightly adjusting the seat plate 20 up and down, the end portions of the pins 60, 62 enter into some of the insert holes 50, 52 which are positioned thereabout so as to stop and fix the seat plate 20 at a desired position.

In accordance with the vertical movement of the seat plate 20, the interlocking member 120 moves vertically and the guide members 130, 140 thus move closer to or apart from each other, thereby adjusting the distance between the shoulder belts 92. That is, as the seat plate 20 is moved upwardly, the shoulder belts 92 move closer to each other. As the seat plate 20 is moved downwardly, the shoulder belts 92 move apart from each other.

After the seat plate 20 is set at a desired position, an infant is seated on the seat plate 20 and the tongues 94 are inserted into the buckle 96. Then, the tension belt 98 is pulled to secure the infant's body to the child seat. In this case, the distance between the shoulder belts 92 is adjusted in accordance with the height of the seat plate 20 in such a manner that the shoulder belts 92, 92 should be positioned about the centers of the right and left shoulders of the infant. Therefore, the infant feels little a sense of incongruity or uncomfortable.

In this embodiment, since the rear end of the rear seat plate 24 is always connected to the seat back 12 as mentioned above, a large space never exists between the seat plate 20 and the seat back 12 even when the seat plate 20 moves up and down and the front seat plate 22 moves forward or backward in accordance with the movement of the seat plate 20. Since the rear seat plate 24 is laid on the front seat plate 22, no space is caused therebetween.

In this embodiment, since the slide frame 66 is biased rearwardly by the spring 86, the pins 60, 62 do not retreat unless the slide frame 66 is pulled forwardly by the handle 80. Therefore, the strength for stopping and fixing the seat plate 20 is extremely high. The adjustment for the height of the seat plate 20 is quite simple just by pulling the handle 80 as mentioned above.

As described above, the distance between the shoulder belts can be adjusted in accordance with the operation for adjusting the height of the seat plate in the child seat of the present invention, thereby improving the feeling of the infant wearing the shoulder belts. According to the present invention, the child seat can be structured not to widen the space between the seat plate and the seat back even when the seat plate is moved up and down.

What is claimed is:

1. A child seat comprising:
    a seat back; a seat plate which can move up and down along the seat back;
    two shoulder belts extending forward from said seat back; and
    distance adjusting means for adjusting the distance between said shoulder belts,
    wherein
        said distance adjusting, means adjusts the distance in accordance with a vertical movement of said seat plate.

2. A child seat as claimed in claim 1, wherein said seat back is provided with a pair of shoulder belt guides which can slide in a width direction of the seat back, said shoulder belts being suspended by said shoulder belt guides, and
    wherein said child seat further comprises an interlocking member for moving said shoulder belt guides closer to each other and apart from each other in accordance with an up-and-down movement of said seat plate.

3. A child seat as claimed in claim 2, wherein said interlocking member moves up and down along a rear surface of said seat back in accordance with the up-and-down movement of the seat plate, and wherein said child seat further comprises means for sliding the shoulder belt guides by transforming the up-and-down movement of said interlocking member into a movement of said shoulder belt guides in a direction of moving closer and apart.

4. A child seat as claimed in claim 3, wherein an upper part of said interlocking member has first and second elongated holes extending vertically wherein said elongated holes are formed obliquely such that they are closer to each other at lower portions thereof and they are spaced apart further from each other at upper portions thereof.

5. A child seat as claimed in claim 4, wherein a seat body is positioned behind the seat back.

6. A child seat as claimed in claim 5, wherein one of said shoulder belt guides is engaged with the first elongated hole and the other shoulder belt guide is engaged with the second elongated hole, and wherein said shoulder belt guides are slidably engaged with a slot which is formed in the seat back to be oblong.

7. A child seat as claimed in claim 6, wherein a level of a center of said slot is highest and a level of both ends thereof is lower.

8. A child seat as claimed in claim 2, wherein said seat plate and said interlocking member are moved together through a link.

9. A child seat as claimed in claim 1, wherein said seat plate comprises a front seat plate and a rear seat plate wherein a rear portion of said front seat plate and a front portion of said rear seat plate are slidably laid on each other, and
    wherein a rear end portion of said rear seat plate is engaged with the seat back such that the rear seat plate can slide up and down.

10. A child seat as claimed in claim 1, wherein said shoulder belts are provided with tongues, respectively and said tongues can be latched to a buckle.

11. A child seat as claimed in claim 10, wherein said buckle is disposed on said seat plate.

\* \* \* \* \*